United States Patent [19]

Murphy, Jr.

[11] Patent Number: 4,606,143
[45] Date of Patent: Aug. 19, 1986

[54] BAIT BUCKET

[76] Inventor: Gerald M. Murphy, Jr., 20420 Meadow Pond Pl., Gaithersburg, Md. 20879

[21] Appl. No.: 647,526

[22] Filed: Sep. 5, 1984

[51] Int. Cl.⁴ .............................................. A01K 97/04
[52] U.S. Cl. ................................................... 43/56
[58] Field of Search ........................ 43/56, 55, 57

[56]  References Cited

U.S. PATENT DOCUMENTS

| 302,161 | 7/1984 | Rudolph | 43/55 |
| 1,110,892 | 9/1914 | Cather | 43/56 |
| 1,942,756 | 1/1934 | Howard | 43/56 |
| 2,055,912 | 9/1936 | Schonger | 43/56 |
| 2,644,269 | 7/1953 | Ormesher | 43/55 |
| 2,664,854 | 1/1954 | Talbot . | |
| 2,734,305 | 2/1956 | Hannah | 43/56 |
| 3,009,281 | 11/1961 | Unger | 43/56 |
| 3,039,225 | 6/1962 | Semelka | 43/56 |
| 3,339,305 | 9/1967 | Smith | 43/56 |
| 3,468,289 | 9/1969 | Broida | 43/55 |
| 4,000,577 | 1/1977 | Kelley | 43/55 |
| 4,260,070 | 4/1981 | Pierson | 43/56 |

Primary Examiner—Gene P. Crosby

[57] ABSTRACT

A hand-held portable live bait bucket having a flexible bait-receiving net carried by a support member. The live bait can be poured from the bucket into the bait-receiving net and the support member opened to remove the bait.

22 Claims, 9 Drawing Figures

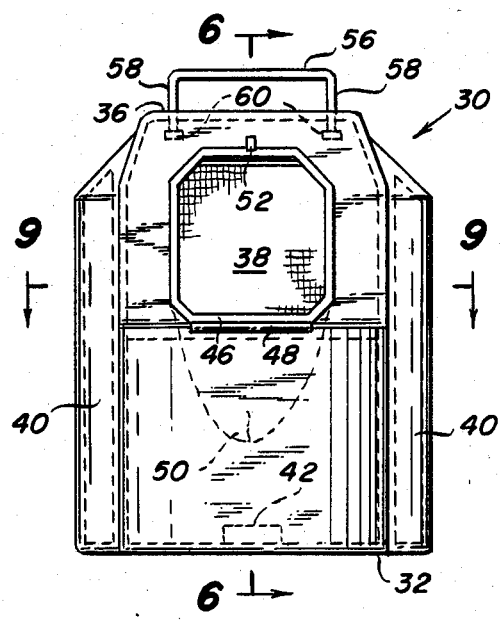
FIG. 5
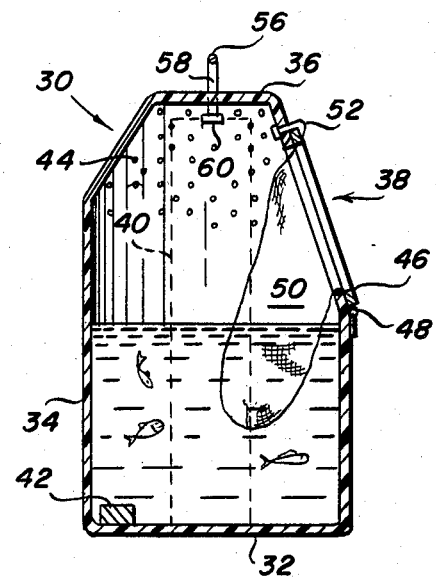
FIG. 6
FIG. 7
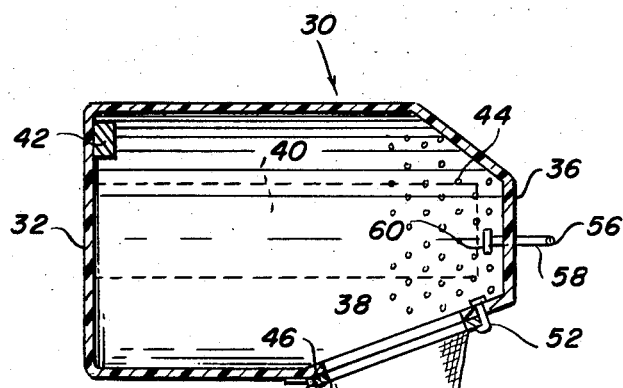
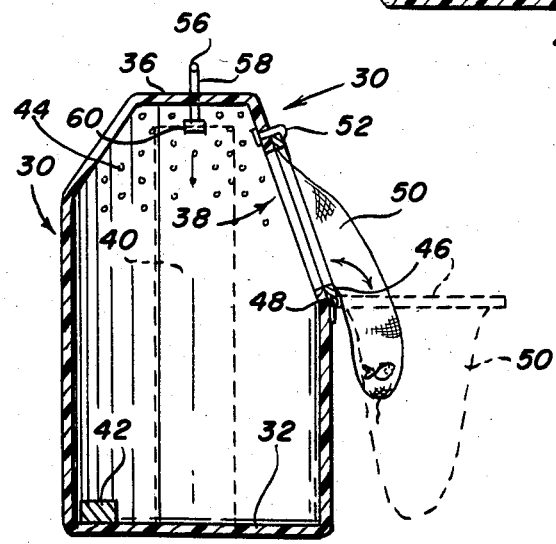
FIG. 8
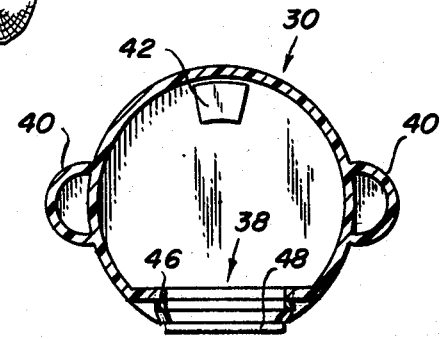
FIG. 9

BAIT BUCKET

FIELD OF THE INVENTION

The present invention relates to portable live bait buckets, particularly hand-held live bait buckets for storing and transporting minnows, hellgrammites and crayfish.

BACKGROUND OF THE INVENTION

Various hand-held bait buckets are known in the art. However, when using the known bait buckets, problems are often encountered in removing bait such as minnows from the bucket by hand. In many of the known bait buckets the fisherman must reach into the water in the bait bucket and attempt to catch the minnows or other live bait which are swimming in the water. There have been many proposals for solving this problem; however, many of these proposals are either expensive, cumbersome or ineffective.

SUMMARY OF THE INVENTION

The present invention is directed to an improved live bait bucket in which live bait can be easily introduced into the bucket transported in the bucket and removed from the bucket. These objects are accomplished by providing a flexible bait receiving member such as a woven net on the bait bucket.

The bait bucket is formed of a rigid container having a bait-removing opening therein, support means surrounding the bait-removing opening connected with the container for movement from a first closed position to a second open position, connection means for connecting the support means with the container which allows for movement of the support member from the first closed position to the second open position, and a flexible substantially non-resilient bait-receiving member connected with the support means whereby when the support means is in the closed position the bait-receiving member covers the opening and live bait can be poured from the rigid container into the flexible bait-receiving member through the bait-removing opening and the support member can be moved to the second open position whereby bait can be removed from the bait-receiving member. The bait-removing opening can be formed in an appropriate location in the container, preferably in the upper portion of a sidewall thereof or in the top of the container.

The hand-held live bait container may include a container having a bait-removing opening disposed in the upper portion thereof; a support member surrounding said opening; flexible and porous bait-receiving means connected with said support member and arranged around said bait-removing opening; and connection means for releasably connecting said support member with said container from a first closed position adjacent to and surrounding said opening to a second open position wherein bait can be poured from said container through said bait-removing opening and into said bait-receiving means in said closed position and bait can be removed from said bait receiving means in said open position.

The bait-removing opening of the container is arranged relative to the sidewalls of the container such that bait can be easily poured from the container into the bait-receiving means through the support member when the container is tipped at an angle ninety degrees from vertical. To accomplish this result at least one of the sidewalls of the container should run directly toward the bait-removing opening and support ring whereby water and/or bait will run along the sidewall and into the bait-receiving means without encountering any substantial obstructions.

The container portion of the bait bucket preferably contains a plurality of small aerating openings or holes in the sidewall and/or top thereof. The aerating holes are preferably located in the upper portion of the container so that when the container is carried in a vertical position for transporting the bait, water contained in the container does not pour out of the container. In order to facilitate pouring of water from the container portion into the bait receiving portion it is preferable that the sidewall does not contain aerating holes in a portion of the container adjacent to the bait-removing opening whereby water can be poured directly from the container portion into the bait-receiving portion without flowing out through the aerating holes. However, aerating holes can be formed entirely around the bait-removing opening as long as these holes are small enough so that they do not allow bait to be poured out of the container through the aerating holes.

The support member which surrounds the bait-removing opening is preferably in the form of a support ring or a support frame which can be connected with the container by a pivot and/or latch or other means suitably arranged adjacent the bait-removing opening. The support ring or support frame may be held in the closed position adjacent to and surrounding the bait-removing opening by a resilient clip, a movable clip or a spring biased pivot which connects the support ring with the container portion of the bucket. The support ring preferably pivots outwardly and away from the container.

The bait bucket may also be provided with a handle such as a molded plastic handle or a rope handle, buoyancy chambers for providing a positive buoyancy for said bait bucket in water, and weight means which preferably has a density greater than the density of water for causing the bait bucket to be disposed in a predetermined position when it is floating in water.

BRIEF DESCRIPTION OF THE DRAWING

FIG. 5 is a side elevational view of a second embodiment of the bait bucket of the present invention;

FIG. 6 is a cross-sectional view of the bait bucket taken along lines 6—6 of FIG. 5;

FIG. 7 is a cross-sectional view corresponding to FIG. 6 wherein the bait bucket is in a position whereby bait can be poured from the bucket into the net;

FIG. 8 is a cross-sectional view corresponding to FIG. 6 showing the net on the outside of the bucket; and FIG. 9 is a cross-sectional view taken along line 9—9 of FIG. 5.

DETAILED DESCRIPTION OF THE INVENTION

Figure 1:
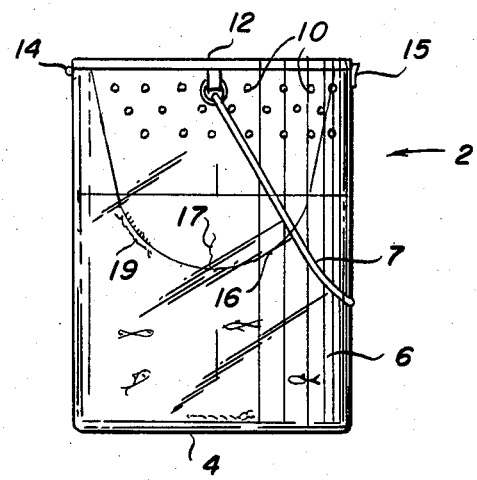
FIG. 1 is a side elevational view of a bait bucket in accordance with the present invention which is filled with bait and water, said bait bucket being shown as formed from clear plastic for purposes of illustration.

As shown in the embodiment of FIGS. 1-4, the bait bucket of the present invention includes a generally cylindrically shaped bucket or container portion 2. The container portion 2 can be formed of a variety of materials such as synthetic plastic or sheet metal and is preferably formed of molded plastic. The container contains a generally flat disc-shaped bottom wall 4 and a generally cylindrical sidewall 6. A rope handle 7 is secured to the upper end of the container. The top of the container is open to form a bait-removing opening 8. The sidewall 6 contains a plurality of aerating holes 10 in the upper portion thereof, preferably adjacent to the bait-receiving opening. The container may be turned upside down and stood in shallow water whereby water will flow through the aerating holes 10 while the bait is contained in the container.

Figure 2:
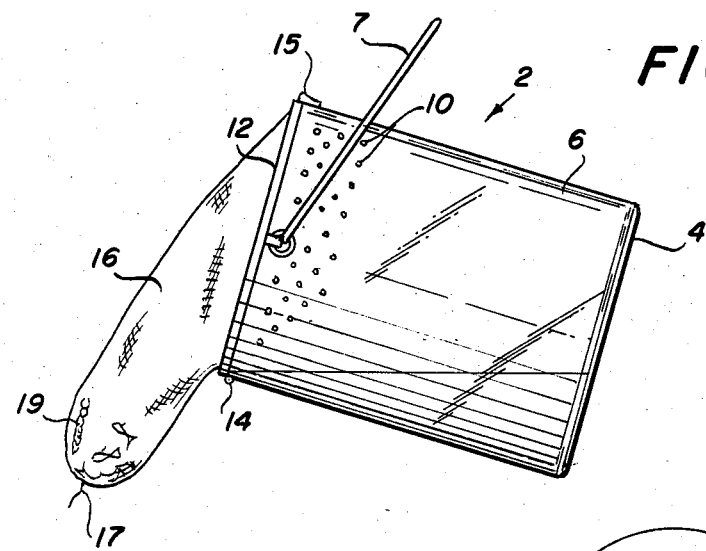
FIG. 2 is a side elevational view of the bucket of FIG. 1 in a tipped position whereby bait and water are poured out of the bait bucket.
Figure 3:
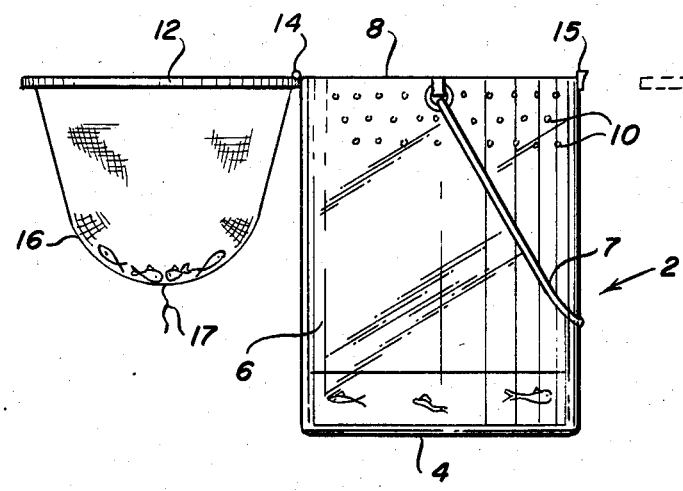
FIG. 3 is a side elevational view of the bait bucket of FIG. 1 with the cover thereof in the open position.

A support ring 12 is pivotally connected with the sidewall 6 by a conventional spring-biased pivot 14 which holds the support ring in the closed position. A quick release latch 15 may also be provided to further assure that the support ring remains in the closed position. The support ring 12 has a shape which substantially corresponds to the shape of the opening 8 and has an outer diameter which is preferably slightly larger than the opening 8 whereby the support ring sits on the open end of the container and can be moved from a first closed position as shown in FIGS. 1 and 2 to a second open position as shown in FIG. 3.

Figure 4:
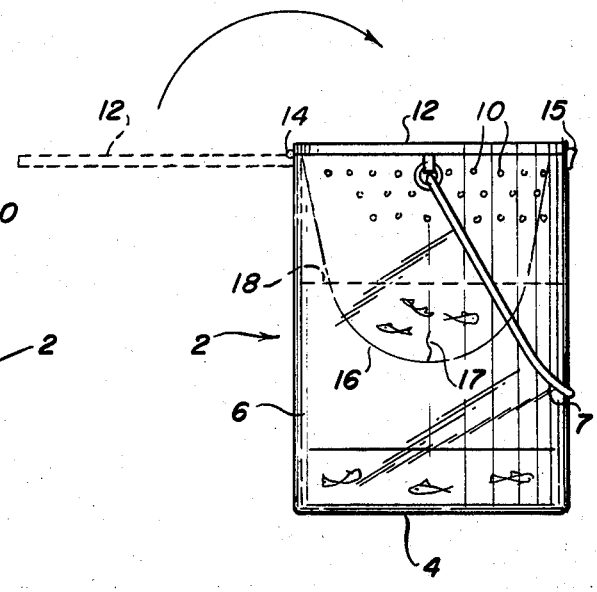
FIG. 4 is a side elevational view of the bait bucket of FIG. 1 with bait stored in the net.

A flexible net 16 is secured to the support ring 12. A string 17 is secured to the net so that the net can be easily grasped. The net can be formed of a variety of materials but is preferably formed of a flexible substantially non-resilient material such as nylon cloth, cotton cloth, etc. The cloth or netting material is preferably highly porous whereby water can be easily poured through the net while at the same time retaining live bait therein. The net serves two primary functions, namely, to serve as a cover to hold live bait in the container during transportion of the bait bucket (FIG. 1) and to provide a bait-receiving compartment or chamber whereby bait can be poured from the bucket into the net (FIG. 2). In addition, the net can serve as a temporary storage compartment for storing bait which has already been removed from the container portion of the bucket (FIG. 4). As shown in FIG. 4, after bait has been removed from the container the support ring can be returned to the closed position and a portion of the bait can be placed into the net 16 for temporary storage. If the water level inside the container is lower than the bottom of the net the bait will rest in the bottom of the net 16. However, if the container is refilled at least partially with water to a level shown by the dotted line 18 in FIG. 4, the bait will be contained within the net 16 and will be allowed to swim in the water disposed in the container. By using the net as a temporary storage compartment for bait, ready access can be had to a portion of the bait by merely reaching into the net 16 while at the same time keeping most of the bait inside the container 16 thereby preventing the bait from either jumping out of the bucket or crawling out of the bucket. If live bait such as hellgrammites 19 or crayfish attach themselves to the net 16 (FIG. 1), the support ring 12 can be lifted slightly and the hellgrammites or crayfish can be removed directly from the net.

The aerating holes are preferably disposed substantially circumferentially around the top portion of the sidewall 6. However, in order to facilitate pouring of water out of the container portion and into the net a portion of the sidewall adjacent the opening 8, such as the portion adjacent to the pivot 14, will not contain aerating holes or will contain only a small amount of aerating holes. The advantage gained from this feature of the present invention is illustrated in FIG. 2 wherein water can be poured directly from the container 6 into the net 16 without the water escaping through aerating holes.

FIGS. 5-9 illustrate another embodiment of the present invention wherein the bait bucket is formed of a container portion 30 having a generally planar bottom portion 32, a sidewall portion 34 and a top portion 36. A bait-removing opening 38 is formed in the upper portion of the sidewall 34. The container is provided with a pair of generally vertical buoyancy chambers 40 which are disposed on opposite sides of the container. The container also preferably contains a weight 42 which is secured to the bottom wall 32 at a point adjacent to the sidewall 34 and substantially equidistant from the buoyancy chambers 40. The weight 42 is preferably disposed on the side of the bucket opposite from the bait-removing opening 38. By providing the weight in this position when the bait bucket floats in water, the bait-receiving opening will be maintained in an upwardly facing position thereby providing easy access to the contents of the live bait bucket and the aerating holes 44 will be submerged in the water when the bucket is floating in the water during use while fishing when wading in a river or the like.

The live bait bucket also includes a support frame 46 which is pivotally connected with the sidewall 34 of the bait bucket by a pivot 48. A flexible net 50 is secured to the support frame 46. The support frame can be moved from a first closed position as shown in FIG. 6 to a second open position as shown by the dotted lines in FIG. 8. The support frame may be held in the closed position by a resilient clasp 52 or by other suitable means. The hinge 48 can be provided with a spring whereby the frame 46 is spring biased against the portion of the container adjacent the opening to hold the frame in the closed position. As an additional feature, the bucket can be provided with a plastic handle 54 having a carrying portion 56, a pair of side portions 58 slidably disposed in holes in the top of the bucket and an enlarged portion 60 formed on the end of each side portion 68.

I claim:
1. A hand-held live baint bucket, comprising:
a rigid container having a bait-removing opening therein and an inner pouring surface running from a sidewall of said container and extending longitudinally to said bait-removing opening;
support means surrounding said opening movably connected with said container from a first closed position to a second open position;
connection means for connecting said container with said support means and for allowing said movement from said first to said second position; and
a flexible substantially non-resilient bait-receiving member connected with said support means and being arranged in the path of said pouring surface such that when said support means is in said closed position said bait-receiving member covers said opening and live bait can be poured from said rigid container along said pouring surface through said opening and into said flexible bait-receiving member without encountering any substantial obstructions and when said support member is in said open position bait can be removed from said bait-receiving member.

2. The bait bucket of claim 1, comprising said rigid container having said opening in the upper portion thereof; said support means having a support ring surrounding said opening; said connection means having pivot means for pivotally connecting said support ring with said container adjacent said opening; and said bait-receiving member including a flexible bait net connected with said support ring.

3. The bait bucket of claim 1, wherein said pivot is spring biased to hold said support means in said closed position.

4. The bait bucket of claim 1, and further comprising a quick release closure for holding said support means in said closed position.

5. The bait bucket of claim 1, and wherein said bait-removing opening is located in a sidewall of said container and said pivot means is located near the lower portion of said opening.

6. The bait bucket of claim 1, wherein said flexible bait-receiving member is a flexible net.

7. The bait bucket of claim 1, wherein said container has a plurality of aerating holes in a portion of the upper portion of the sidewall thereof.

8. The bait bucket of claim 1, wherein when said container is tipped ninety degrees from the normal upright position, substantially all of the water in said container runs along said pouring surface and bait and water in said container is transferred into said bait-receiving member.

9. The bait bucket of claim 1, wherein said container has a bottom and said sidewall and said bait-removing opening is located adjacent to said sidewall in the upper portion of said container whereby bait and water in said container may be easily poured out of said container through said opening when said container is tipped ninety degrees from the normal upright position.

10. The bait bucket of claim 9, which further comprises handle means connected with said container on the upper portion thereof.

11. A hand-held live bait bucket, comprising:
a bucket having a bait-removing opening disposed in the upper portion thereof and an inner pouring surface running from a sidewall of said container and extending longitudinally to said bait-removing opening;
a support member surrounding said opening;
pivot means pivotally connecting said support member with said bucket adjacent said opening which provides for outward pivotal movement of said support member from a first closed position adjacent said opening to a second open position away from said bucket; and
a bait-receiving net connected with said support member and arranged in the path of said pouring surface wherein when said support member is in said closed position, said bait-receiving net covers said opening and live bait and water can be poured from said pouring surface into said net through said opening without encountering any substantial obstructions.

12. The bait bucket of claim 11, wherein said bait-removing opening is located in the upper portion of a sidewall of said bucket.

13. The bait bucket of claim 12, wherein said pivot means is located adjacent said opening in a position such that said support member can be pivoted to a generally horizontal open position for removing bait from said net.

14. A hand-held live bait container, comprising:
a container having a bait-removing opening disposed in the upper portion thereof and an inner pouring surface extending longitudinally from a sidewall of said container to said bait-removing opening;
a support member surrounding said opening;
a flexible and porous bait-receiving member connected with said support member and being arranged in the path of said pouring surface and around said bait-removing opening; and
connection means for releasably connecting said support member with said container from a first closed position adjacent to and surrounding said opening to a second open position wherein bait can be poured from said container through said bait-removing opening and into said bait-receiving means in said closed position without encountering any substantial obstructions and bait can be removed from said bait-receiving means in said open position.

15. The container of claim 14, wherein said container contains a plurality of aerating holes in a portion of the upper portion thereof.

16. A hand-held live bait bucket, comprising:
a bucket having a bait-removing opening disposed in the upper portion thereof and an inner pouring surface extending longitudinally from a sidewall thereof to said bait-removing opening;
flexible bait-receiving means for receiving bait from the interior of said container and for holding bait therein and operationally connected with and arranged in the path of said inner pouring surface and said bait-removing opening; and
connection means for operationally and releasably holding said flexible bait-receiving means in a first position wherein when said bucket is tipped relative to vertical, live bait can be poured along said pouring surface and into said flexible bait-receiving means without encountering any substantial obstructions and for allowing movement of said bait-receiving means to a second position whereby live bait can be removed from said bait-receiving means.

17. The bucket of claim 16, wherein said connection means comprises a pivot which pivotally connects said flexible bait-receiving means with said bucket for pivotal movement between said first and second positions.

18. The bucket of claim 16, wherein said bait-receiving means is a porous substantially non-resilient net.

19. The bucket of claim 16, wherein said bait-removing opening is in an upper portion of a sidewall of said opening.

20. The bucket of claim 19, which further comprises flotation means for allowing said bucket to float in water with said bait-removing opening disposed upwardly.

21. The bucket of claim 16, wherein said inner pouring surface is a smooth continuous solid surface.

22. A hand-held live bait container bucket, comprising:

a flexible bait-receiving member;

a support member connected with said bait-receiving member, said support member having a bait-removing opening therein;

a bucket having an opening in the upper portion thereof and an internal pouring surface extending longitudinally from a sidewall thereof to said opening; and connection means for releasably holding said support member in a closed position around said bucket opening wherein when said bucket is tipped relative to vertical, live bait can be poured longitudinally along said pouring surface and into said flexible bait-receiving member without encountering any substantial obstructions and for allowing movement to an open position whereby live bait can be removed from said flexible bait-receiving member.

* * * * *